(12) United States Patent
Gaines et al.

(10) Patent No.: US 11,011,839 B2
(45) Date of Patent: May 18, 2021

(54) METHOD FOR ORIENTING REFLECTORS OF A TERAHERTZ COMMUNICATIONS SYSTEM

(71) Applicant: Fundacion Centro de Tecnologias de Interaccion Visual y Comunicaciones Vicomtech, Gipuzkoa (ES)

(72) Inventors: Seán Gaines, Gipuzkoa (ES); Oihana Otaegui Madurga, Gipuzkoa (ES); Gorka Vélez Isasmendi, Gipuzkoa (ES); Harbil Arregui Martiarena, Gipuzkoa (ES); Andoni Mujika Amunarriz, Gipuzkoa (ES); Estíbaliz Loyo Mendivil, Gipuzkoa (ES)

(73) Assignee: FUNDACION CENTRO DE TECNOLOGIAS DE INTERACCION VISUAL Y COMUNICACIONES VICOMTECH, Gipuzkoa (ES)

( * ) Notice: Subject to any disclaimer, the term of this patent is extended or adjusted under 35 U.S.C. 154(b) by 3 days.

(21) Appl. No.: 16/391,862

(22) Filed: Apr. 23, 2019

(65) Prior Publication Data
US 2019/0326669 A1 Oct. 24, 2019

(30) Foreign Application Priority Data

Apr. 24, 2018 (EP) .................................... 18382277

(51) Int. Cl.
*H01Q 3/20* (2006.01)
*H01Q 5/30* (2015.01)
(Continued)

(52) U.S. Cl.
CPC ............... *H01Q 3/20* (2013.01); *G06N 20/20* (2019.01); *G08G 1/0141* (2013.01); *H01Q 5/30* (2015.01)

(58) Field of Classification Search
None
See application file for complete search history.

(56) References Cited

U.S. PATENT DOCUMENTS

| | | | | |
|---|---|---|---|---|
| 6,157,811 A * | 12/2000 | Dent | ...................... | H01Q 1/288 455/12.1 |
| 8,520,695 B1 * | 8/2013 | Rubin | .................... | G01C 21/26 370/445 |

(Continued)

OTHER PUBLICATIONS

Extended Search Report dated Nov. 6, 2018 re: Application No. EP 18382277.4-1220, pp. 1-12, citing: US 8 520 695 B1. US 2010/033390 A1, US 2012/206299 A1 and US 2016/351162 A1.

*Primary Examiner* — Crystal L Hammond
(74) *Attorney, Agent, or Firm* — Cantor Colburn LLP (57) ABSTRACT

A method for orienting reflectors of a communications system in a zone, wherein the communications system includes an antenna and the reflectors. The antenna is operable in one or more frequencies in a frequency range from 0.1 THz to 10.0 THz, with each of the reflectors being spaced apart from each other and the antenna. The method includes the steps of digitally predicting a future motor vehicle density distribution in the zone based on obtained past motor vehicle density distributions in the zone; digitally computing an orientation of each reflector such that the estimated power reception of electromagnetic waves radiated by the antenna is globally maximized for each motor vehicle of the future motor vehicle density distribution; and orienting each reflector according to the digitally computed orientation.

15 Claims, 8 Drawing Sheets

(51) Int. Cl.
*G06N 20/20* (2019.01)
*G08G 1/01* (2006.01)

(56) References Cited

U.S. PATENT DOCUMENTS

| | | | |
|---|---|---|---|
| 2006/0106538 A1* | 5/2006 | Browne | B60R 21/01 |
| | | | 701/301 |
| 2010/0033390 A1* | 2/2010 | Alamouti | H01Q 1/246 |
| | | | 343/755 |
| 2012/0206299 A1 | 8/2012 | Valdes-Garcia | |
| 2015/0102956 A1* | 4/2015 | Miles | G01S 13/89 |
| | | | 342/73 |
| 2016/0351162 A1* | 12/2016 | Miura | G09G 5/14 |

* cited by examiner

METHOD FOR ORIENTING REFLECTORS OF A TERAHERTZ COMMUNICATIONS SYSTEM

CROSS REFERENCE TO RELATED APPLICATIONS

This application is related to and claims the benefit of Spanish Patent Application No. 18382277.4, filed on Apr. 24, 2018, the contents of which are herein incorporated by reference in their entirety.

TECHNICAL FIELD

The present disclosure relates to the field of wireless communications for data communications with motor vehicles. More specifically, the present disclosure relates to a method for orienting reflectors of a terahertz communications system based on predicted traffic distributions and to the system with the capability of orienting the reflectors thereof.

BACKGROUND

Wireless communications have evolved very rapidly in the last few decades due to the increase in data demand due to new services based on the Internet. As a result, over the last few years new cellular communications networks have been developed and globally deployed so as to cope with the amount of data downloaded and uploaded by the users. When the so-called 4G cellular networks (i.e. Long Term Evolution) had been first developed, 5G cellular networks were already envisioned in order to keep up with the increase in data demand.

Short-range communications are to provide high data rates owing to the wide available bandwidths in the spectrum thereof, and thus they are to provide different 5G cellular networks with cells having different sizes, mainly ranging from pico to macro. A portion of the spectrum to be used for said short-range communications is the terahertz range ranging from 0.1 THz up to 10.0 THz, commonly referred to as the terahertz gap. Electromagnetic waves with frequencies within this range feature large propagation losses; as it is known, the higher the frequency the larger the propagation losses in free-space as defined in the Friis transmission formula. Therefore, such electromagnetic waves propagate at most few hundreds of meters before the received power becomes so low that a commercial receiver cannot demodulate the data in them.

In addition to the propagation losses, in most cases electromagnetic waves in the Terahertz gap may only be properly detected by a receiving antenna when there is line-of-sight between the transmitting and the receiving antennas. These two phenomena considerably impact the performance of terahertz wireless communications systems. Therefore, in order to have a good terahertz radio link in presence of obstacles that may block line-of-sight, more lines-of-sight need be provided by adding further transmitters (resulting in additional electric power consumption) or reflectors that produce additional lines-of-sight when correctly oriented.

The need for large data transmissions is common among users, but also among motor vehicles, because users are inside using electronic devices and because new developments in motor vehicles such as driving assistances and autonomous driving may require data. In the case of motor vehicles, due to the size thereof other motor vehicles tend to block line-of-sight of transmitters operating at terahertz frequencies. And in addition to the size, since motor vehicles move at low and high speeds, their dynamics further difficult avoiding line-of-sight blockings.

There is an interest in providing a method for orienting reflectors of a terahertz communications system for wireless communications with motor vehicles such that the reflectors enable transmission and reception of electromagnetic waves even if no direct line-of-sight between transmitter (e.g. a static transmitting antenna, an antenna of a motor vehicle) and receiver (e.g. an antenna of a motor vehicle, a static receiving antenna) exists. There is also an interest in providing such a terahertz communications system where the system has the capability of orienting reflectors.

SUMMARY

A first aspect of the disclosure relates to a method for orienting a plurality of reflectors of a communications system in a zone, the communications system comprising an antenna and the plurality of reflectors, the antenna being operable in one or more frequencies in a frequency range from 0.1 THz to 10.0 THz, each reflector of the plurality of reflectors being spaced apart from each other and the antenna, the method comprising:

digitally predicting a future motor vehicle density distribution in the zone based on a plurality of obtained past motor vehicle density distributions in the zone;

digitally computing an orientation of each reflector of the plurality of reflectors such that estimated power reception of electromagnetic waves radiated by the antenna is globally maximized for each motor vehicle of the future motor vehicle density distribution in the zone; and orienting each reflector of the plurality of reflectors according to the digitally computed orientations.

With the present method, the communications system may be adjusted by means of reorientation of the reflectors thereof so that at least some vehicles that are expected to be present (according to the prediction) in the zone may receive electromagnetic waves of the antenna with more power, based on the number and distribution of the expected motor vehicles. Since the power to be received by each expected motor vehicle depends on the orientation of the reflectors, and the power with which the antenna radiates the electromagnetic waves may be substantially constant over time, dynamically modifying the orientation of the reflectors may homogenize the power that each expected motor vehicle is to receive.

Owing to the global maximization, expected motor vehicles that could receive electromagnetic waves with a large power may receive less power upon reorienting the reflectors. In exchange, however, expected motor vehicles that would have received the electromagnetic waves with a low power may receive them with more power owing to additional paths (for the electromagnetic waves to reach the expected motor vehicles) that the reflectors provide upon reorientation thereof. Therefore, the method does not aim at maximizing the estimated power to be received by each expected motor vehicle in isolation from estimated power to be received by the other expected motor vehicles, but rather it aims at maximizing the estimated power to be received by all expected motor vehicles such that variation in estimated received power between all pairs of expected motor vehicles is as low as possible in order to homogenize the estimated received power.

Different sets of orientations (each set being a group of one orientation for each reflector) are computed according to the global maximization approach, and the set of orientations that achieves the best result in terms of estimated power reception of expected motor vehicles is then applied to the reflectors, namely each reflector is reoriented according to its corresponding orientation of the set of orientations to be applied. The orienting of the reflectors is carried out when a future time span (i.e. the period of time for which the future motor vehicle density distribution has been predicted) starts or before the future time span starts.

Even though the present disclosure refers to the radiation of electromagnetic waves by the antenna and the power reception of the motor vehicles, that is motor vehicle downlink wireless communications, it is readily apparent that the same method is applicable to radiation of electromagnetic waves by the motor vehicles and power reception of the antenna, that is motor vehicle uplink wireless communications. In this regard, optimization of communications by orienting the reflectors may be achieved for said downlink and uplink communications, that is, the optimization may be achieved for bi-directional communications as well.

In some embodiments, digitally predicting the future motor vehicle density distribution in the zone based on the plurality of obtained past motor vehicle density distributions in the zone comprises:
  obtaining a number of motor vehicles in the zone in a plurality of time spans;
  digitally providing a grid for each time span of the plurality of time spans, each grid comprising a plurality of cells each representing a number of motor vehicles in a corresponding portion of the zone in a corresponding time span of the plurality of time spans; and
  digitally providing a prediction grid for a future time span based at least on the grids of the plurality of time spans, the prediction grid comprising a plurality of cells each representing a number of predicted motor vehicles in a corresponding portion of the zone in the future time span.

During each time span, each motor vehicle that is or has been within the zone is represented in the grid corresponding to that time span. In this sense, each grid has represented therein each motor vehicle that has been present and counted (in the number of motor vehicles) during the time span. This means that a motor vehicle moving within the zone and which has been present in two or more different portions of the zone (each portion having its corresponding cell) during a same time span may be counted as being present in each of the two or more different portions). The grids thus implicitly describe how the zone evolves over time in terms of motor vehicles since the motion thereof is also represented as additional motor vehicles present in the trajectories followed by the motor vehicles.

The prediction grid is provided by estimating the number of motor vehicles that may be in each portion of the zone based on the grids of the plurality of time spans and how these have varied; in this sense, the comparison of the grids of the plurality of time spans may reveal traffic dynamics useful for providing the prediction grid. To this end, it has been found that predicting with grids of a plurality of time spans the resulting prediction grid may accurately reflect the future presence of motor vehicles in most portions (or each portion) of the zone.

When the prediction grid is provided with an algorithm, the algorithm is preferably trained before providing the prediction grid. The algorithm is trained by means of datasets with motor vehicle density distributions.

In some embodiments, digitally computing the orientation of each reflector of the plurality of reflectors such that estimated power reception of electromagnetic waves radiated by the antenna is globally maximized for each motor vehicle of the future motor vehicle density distribution comprises:
  digitally estimating a power reception of electromagnetic waves radiated by the antenna at each cell of the prediction grid and with a predetermined orientation of each reflector of the plurality of reflectors; and
  digitally computing an orientation of each reflector of the plurality of reflectors based on the estimation of the power reception such that an estimated power reception is globally maximized for each predicted motor vehicle of the prediction grid.

The estimation of the power reception at each cell of the prediction grid depends on the location of the antenna, the location and orientation of each reflector, and possible blockings of line-of-sight from the antenna or a reflector to the cell of the grid (owing to the presence of obstacles such as, for instance, motor vehicles). According to this estimation, different orientations may be computed, and the one achieving the global maximization be selected for orienting the reflectors.

In some embodiments, the plurality of time spans is a plurality of consecutive time spans.

When the time spans (for which the number of motor vehicles in the zone are obtained) are consecutive, the data obtained may result in a more accurate prediction of the future motor vehicle density distribution and, thus, a more accurate prediction grid for the future time span. Time spans are consecutive when the time elapsed between the end of a time span and the start of the next time span is less than a duration of one time span, preferably less than 50% of the duration of one time span, and more preferably less than 20%, 10% and/or 5% of the duration of one time span.

In some embodiments, the digital computation of the orientation of each reflector of the plurality of reflectors comprises a number of sets of orientations that are digitally computed. In some of these embodiments, the number of sets of orientations is a predetermined value.

A plurality of sets of orientations may be digitally computed prior to choosing the one that provides the best result. The number of sets of orientations to be computed may be adjusted according to a desired accuracy in the global maximization of estimated power reception and a processing time thereof (that may depend on, for example, the number of reflectors in the communications system; the number of expected motor vehicles; the size of the zone, etc.). Since the number of expected motor vehicles is largely variable and depends on the time of the day, the number of sets of orientations to be digitally computed may be dynamically adjusted depending on the variation in the number of expected motor vehicles.

In some embodiments, each time span of the plurality of time spans has a first time duration; and the future time span starts after a second time duration upon ending of a last time span of the plurality of time spans. In some of these embodiments, the second time duration is equal to or less than ten times the first time duration. Preferably, the second time duration is greater than the first time duration, and more preferably the second time duration is equal to or greater than two times the first time duration and equal to or less than five times the first time duration.

For an accurate prediction of expected motor vehicles, the future time span should preferably start after a time duration of two time spans and before a time duration of five time spans, both time durations starting after the last time span for which a grid has been provided. This is so because further steps need to be performed (e.g. digital computation of orientations for the reflectors and reorientation of the reflectors) once the grids for the prediction have been provided.

The accuracy of predictions for a future time span starting after a time duration of ten time spans may be low and, thus, such prediction grids are less preferred.

In some embodiments, the future time span has the first time duration. In some other embodiments, the future time span has a third time duration, the third time duration being a multiple of the first time duration. Preferably, when the future time span has the third time duration, the third time duration is less than ten times the first time duration, more preferably less than five times the first time duration, and even more preferably is two times or three times the first time duration.

The longer the duration of the future time span is, the less often the reflectors may be reoriented as the applied orientations are preferably maintained during most of or the entirety of the future time span. Depending on the traffic dynamics, it may be preferable to have shorter future time spans as further reorientations may be carried out based on further prediction grids that predict more accurately the number of expected motor vehicles.

In some embodiments, the first time duration is equal to or greater than 30 seconds, and less than or equal to 60 seconds.

It has been found that time spans with a time duration ranging between 30 and 60 seconds (e.g. time duration of 30 s, 35 s, 40 s, 45 s, 50 s, 55 s, 60 s, etc.) may provide an accurate representation of traffic dynamics for both present and expected motor vehicles.

In some embodiments, obtaining the number of motor vehicles in the zone in the plurality of time spans comprises obtaining the number of motor vehicles in as many pluralities of time instants as time spans of the plurality of time spans, wherein each time span of the plurality of time spans comprises a corresponding plurality of time instants of the pluralities of time instants.

In some embodiments, each cell of the grid for each time span represents the number of motor vehicles in the portion of the zone corresponding to the cell as an aggregate of the number of motor vehicles at each time instant of the plurality of time instants of the corresponding time span.

As each time span has a duration, in order to represent the presence of the motor vehicles within the zone and the corresponding motion thereof, the presence of the motor vehicles is obtained in a plurality of time instants while each time span lasts. At each time instant the number of motor vehicles is obtained, and the corresponding time span will be represented with its grid having the number of motor vehicles in each time span.

In some cases, the number of motor vehicles in each cell is the aggregate number of motor vehicles counted in the corresponding portion in each time instant of a same time span. In some other cases, the number of motor vehicles in each cell is the average number of motor vehicles counted in the corresponding portion in each time instant of a same time span.

The grid for each time span will reflect the presence of motor vehicles within the zone more accurately as more time instants are in each plurality of time instants. By way of example, when the number of motor vehicles is the aggregate resulting from five time instants, if the number of motor vehicles in the corresponding portion in the first three time instants is two, and the number of motor vehicles in said corresponding portion in the last two time instants is four, the number of motor vehicles of that cell for that time span is 14. Taking the same example but considering the number of motor vehicles as the average, the number of motor vehicles of that cell for that time span is 14/5=2.8.

In some embodiments, each plurality of time instants is a plurality of consecutive time instants.

When the time instants (for which the number of motor vehicles in the zone are obtained) are consecutive, the data obtained may result in a more accurate prediction of the future motor vehicle density distribution and, thus, a more accurate prediction grid for the future time span. Time instants are consecutive when the time elapsed between each pair of time instants is the same (e.g. a second time instant takes place X time after a first time instant, a third time instant takes places X time after the second time instant, a fourth time instant takes place X time after a third time instant, and so on, wherein X time is the same for all of them; for example but without limitation, X time may be 0.2 seconds or less than 0.2 seconds, 0.5 seconds, 1.0 seconds, 2.0 seconds or more than 2.0 seconds, etc.).

In some embodiments, the plurality of time spans at least comprises first, second and third time spans; the pluralities of time instants at least comprise first, second and third pluralities of time instants; the first, the second, and the third time spans respectively comprise the first, the second, and the third pluralities of time instants.

In some embodiments, digitally providing a prediction grid for a future time span comprises:
  digitally computing neighbors with a neighbor order parameter Π for each cell of the grids for the plurality of time spans, the neighbor order parameter Π being 1 or 2.

The use of neighbors may be a costly operation in terms of processing power due to the increase in number of observed features, but it assists in representing the existing traffic dynamics in so far it provides a relationship between adjacent cells of the grids.

In some embodiments, digitally providing a prediction grid for a future time span comprises or further comprises:
  digitally discarding each cell of the grids for the plurality of time spans for which the number of motor vehicles is lower than a predefined threshold; and
  digitally running a regression algorithm on the grids for the plurality of time spans resulting from the steps of digitally computing the neighbors and digitally discarding cells, thereby providing the prediction grid.

In order to speed up the provision of the prediction grid, cells with fewer motor vehicles than the predefined threshold (e.g. 1 motor vehicle, 2 motor vehicles) are discarded, i.e. the value of the cells (the number of motor vehicles present) is equated to zero, so that the computational burden of running the regression algorithm is reduced. Despite the accuracy of the prediction grid is reduced by discarding said cells, the reduction in computational burden may be considerable thereby resulting a good trade-off between required processing power and accuracy of the resulting prediction.

In some embodiments, the regression algorithm is a random forest regression algorithm.

The random forest regression algorithm provides decision tree models that are suitable for regression and which are simple and easy to configure. The forests of the algorithm are formed by growing trees depending on a random vector such that the tree prediction takes on numerical values rather than class labels.

In some embodiments, the steps of digitally computing the neighbors and/or digitally running the regression algorithm on the grids are/is carried out on the original grids for the plurality of time spans, that is, the step of digitally discarding each cell of the grids for the plurality of time spans for which the number of motor vehicles is lower than a predefined threshold is not carried out so that all numbers of motor vehicles are taken into account when running the regression algorithm.

In some embodiments, digitally estimating the power reception of electromagnetic waves radiated by the antenna at each cell of the prediction grid and with the predetermined orientation of each reflector of the plurality of reflectors comprises:

for each cell of the prediction grid (preferably only for each cell of the prediction grid having a number of motor vehicles greater than zero), digitally computing:

$$R_{tot,xy} = R_{tr,xy} + \sum_{j=1}^{J} R_{j,xy}$$

$$R_{tr,xy} = R_o - \alpha(f, r)$$

$$\alpha(f, r) = 10\log_{10}\Psi(f, r) + 10\log_{10}\beta(f, r) + L_{NLoS}$$

$$\Psi(f, r) = \left(\frac{c}{4\pi f r}\right)^2$$

$$\beta(f, r) = e^{-\frac{1}{2}k(f)r}$$

$$k(f) = \sum_g \frac{p}{p_0} \frac{T_0}{T} \sigma^g(f)$$

$$L_{NLoS} = \begin{cases} J(v_{o_2}) + T(J(v_{o_1}) + J(v_{o_3}) + C) & v_{o_2} > -0.78 \\ 0 & v_{o_2} \leq -0.78 \end{cases}$$

$$T = 1 + e^{-\frac{J(v_{o_1})}{6}}$$

$$C = 10 + 0.04r$$

$$R_{j,xy} = R_o - (10\log_{10}\Psi(f, r_{tr,j} + r_{rr,j}) + 10\log_{10}\beta(f, r_{tr,j} + r_{rr,j}) + L_{NLoS})$$

where x is a column of a cell on the prediction grid; y is a row of a cell on the prediction grid; $R_{tot,xy}$ is estimated power reception for cell x,y; $R_o$ is the power received without considering the path loss; j is a j-th reflector of the plurality of reflectors; J is total number of reflectors of the plurality of reflectors; f is frequency of operation of the antenna; r is distance from the antenna to a center of a cell (directly and/or indirectly through a reflector providing line-of-sight, in which case r is the total distance); k(f) is molecular absorption; p is system pressure (depending upon the environment, for instance but without limitation p=0.98692 atm); $p_0$ is reference pressure (for instance but without limitation $p_0$=1 atm); $T_0$ is standard temperature (for instance but without limitation $T_0$=273.15 K); T is system temperature (depending upon the environment, for instance but without limitation T=298.15 K); $\sigma^g(f)$ is absorption cross section (for example with water vapor considered as the only gas); $r_{tr,j}$ is distance from the antenna to the j-th reflector; $r_{rr,j}$ is distance from the j-th reflector to the center of a cell; c is speed of light; and $v_{o_k}$ is a dimensionless parameter corresponding to a k-th obstacle. In some embodiments, $R_o$ implies the addition of the baseband signal power, the conversion gain of the receiver, the antenna gain in the receiver and the antenna gain in the transmitter, and the subtraction of the transmitter's conversion loss, the receivers' noise figure, and other losses due to the specific features of the deployment environment, like the signal reflection and scattering caused by building walls and other static objects.

In some of these embodiments:

$$J(v_{o_k}) = 6.9 + 20\log_{10}(\sqrt{(v_{o_k} - 0.1)^2 + 1} + v_{o_k} - 0.1)$$

In some others of these embodiments:

$$J(v_{o_k}) = P_{o_k}\left(6.9 + 20\log_{10}\left(\sqrt{(v_{o_k} - 0.1)^2 + 1} + v_{o_k} - 0.1\right)\right)$$

where $P_{o_k} = \begin{cases} 1 - \dfrac{\left(\dfrac{cap \cdot (s-1)}{m_{xy}}\right)}{\left(\dfrac{cap \cdot s}{m_{xy}}\right)} & m_{xy} \leq cap \cdot (s-1) \\ 1 & m_{xy} > cap \cdot (s-1) \end{cases}$;

cap is capacity of number of motor vehicles of each cell; $m_{xy}$ is prediction obtained for the cell (i.e. number of predicted motor vehicles); and s is number of time instants of the future time span.

By computing the aforementioned formulas for each cell of the prediction grid (preferably the ones having a number of predicted motor vehicles greater than zero so that computational power is not unnecessarily spent making the calculations for cells in which no motor vehicles are predicted), it is estimated the power with which electromagnetic waves of the antenna are to arrive at the cells with the predetermined orientation of each reflector of the plurality of reflectors (e.g. a fixed set of orientations, a previously computed set of orientations, a set with the current orientations of the reflectors, etc.). The estimated power thus considers the reflections of the electromagnetic waves on the reflectors based on said orientations: if according to the physics of reflection there is line-of-sight from the antenna to a motor vehicle through a reflector (based on an orientation thereof), the power coming from the reflector is taken into account whereas if according to said physics the reflector is oriented such that there is no line-of-sight, then no power coming from the reflector is taken into account. The estimated power also considers the reception of electromagnetic waves with direct line-of-sight with the antenna, propagation losses, losses due to other cars between the transmitter and the receiver (which in these particular embodiments is computed with the cascaded knife edge method as set out in ITU-R, "Propagation by diffraction," International Telecommunication Union, Geneva, Draft new Report, 2009).

In those other embodiments, additionally an obstacle finding probability $P_{o_k}$ is provided with which the $J(v_{o_k})$ losses are weighted. In this regard, $P_{o_k}$ provides the probability that at least one motor vehicle is to be found in a given cell of the prediction grid at a time instant of the future time span.

It is readily apparent for the skilled person that other equations (for estimating the power reception of electromagnetic waves radiated by the antenna at each cell of the prediction grid and with the predetermined orientation of each reflector of the plurality of reflectors) may be used instead without departing from the scope of the present disclosure. For example, more accurate equations or simpler equations (e.g. perfect or imperfect reflectors, more or fewer obstacles taken into account, different propagation losses, etc.) could be digitally computed in other embodiments of the disclosure.

In some embodiments, digitally computing an orientation of each reflector of the plurality of reflectors comprises digitally running a genetic algorithm with the prediction grid and the digitally estimated power reception, the genetic algorithm digitally computing the orientation of each reflector of the plurality of reflectors.

The genetic algorithm attempts to optimize an objective function. In some embodiments, the objective function to be optimized is the following:

$$\overline{R} = \frac{\sum_{x=1}^{N_x} \sum_{y=1}^{N_y} R^*_{tot,xy} \overline{asn_{t,xy}}}{\sum_{x=1}^{N_x} \sum_{y=1}^{N_y} \overline{asn_{t,xy}}}$$

wherein $\overline{asn_{t,xy}}$ is prediction obtained for a cell x,y (i.e. number of predicted motor vehicles); $N_x$ is a number of columns that the prediction grid has; $N_y$ is a number of rows that the prediction grid has; and:

$$R^*_{tot,xy} = \begin{cases} R_{tot,xy} & R_{tot,xy} > TH \\ P \cdot (R_{tot,xy} - TH) & R_{tot,xy} \leq TH \end{cases};$$

wherein $R_{tot,xy}$ is the total computed received power in the cell x,y; P is a penalization factor (that may be adjusted based on the traffic dynamics, the zone, the number of reflectors, etc., the penalization factor may be e.g. 5, 15, 30, 50, 80, etc.); and TH is a threshold value (in dBm). The objective function depends on the orientation of each reflector, thus by optimizing said function the orientations are changed and, thus, optimized. The $R^*_{tot,xy}$ parameter aims at maximizing a coverage in the cells while providing a minimum power (TH) in cells of the prediction grid (which correspond to portions of the zone) in which few motor vehicles are predicted. Since cells having more motor vehicles may make the optimization more favorable towards them, cells with fewer motor vehicles may tend to receive electromagnetic waves with little or no power at all, thus the TH parameter partially homogenizes the overall coverage.

It is readily apparent for the skilled person that other objective functions may be used instead without departing from the scope of the present disclosure. For example, more accurate objective functions or simpler objective functions could be optimized in other embodiments of the disclosure.

In some embodiments, the genetic algorithm comprises:
a plurality of individuals, each individual encoding a configuration of the plurality of reflectors, each individual comprising a plurality of genes, each gene encoding an orientation angle of a reflector of the plurality of reflectors;
recombination of two individuals whereby a first half of the orientation angles are taken from a first individual of the two individuals and a second half of the orientation angles are taken from a second individual of the two individuals; and
mutation whereby values of a fourth of the orientation angles are increased or decreased.

The fourth of the orientation angles may be randomly selected, and the increase or decrease of the orientation angles may also be carried out randomly.

In some embodiments, the first half of the orientation angles is a rounded up half, and the second half of the orientation angles is a rounded down half. For instance, if the number of reflectors is odd, e.g. 9 reflectors, the first half of the orientation angles comprises 5 orientation angles and the second half of the orientation angles comprises 4 orientation angles.

In some embodiments, the fourth of the orientation angles is a rounded up or a rounded down fourth. For instance, if the number of reflectors is 9 reflectors, the rounded up and the rounded down fourth of the orientation angles is 3 and 2, respectively.

In some embodiments, the genetic algorithm further comprises initialization with a first population whereby each gene of each individual of the plurality of individuals has a value:
randomly assigned; or assigned according to a digitally computed orientation angle of a corresponding reflector, the digitally computed orientation angle being a previous digital computation of an orientation of each reflector of the plurality of reflectors based on a previous estimation of the power reception such that an estimated power reception is globally maximized for each predicted motor vehicle of a different prediction grid.

In some embodiments, digitally computing an orientation of each reflector of the plurality of reflectors comprises digitally running a deep neural network with the prediction grid and the digitally estimated power reception, the deep neural network digitally computing the orientation of each reflector of the plurality of reflectors.

In some embodiments, obtaining the number of motor vehicles in the zone in the plurality of time spans comprises: receiving position information of the motor vehicles in the plurality of time spans, the position information being provided by the communications system or a global navigation satellite system.

In some embodiments, obtaining the number of motor vehicles in the zone in the plurality of time spans comprises: detecting the presence of motor vehicles in the zone in the plurality of time spans with one or more presence sensors. In some of these embodiments, the one or more presence sensors comprise at least one of: one or more cameras, one or more lidars (i.e. light detection and ranging), and one or more radars (i.e. radio detection and ranging).

In some embodiments, a time between each pair of time instants of a plurality of time instants of the pluralities of time instants is based on a time resolution of the process, device or system with which the number of motor vehicles is obtained. Preferably, in these embodiments, each plurality of time instants is a plurality of consecutive time instants.

In an example, if the number of motor vehicles is obtained by counting, by digital image processing, the number of motor vehicles appearing in images taken by one or more cameras, the time between each pair of time instants may be equal to or greater than the time between two consecutive images taken by the one or more cameras (e.g. 0.5 s, 1 s, 2 s, 4 s, etc.). In another example, if the number of motor vehicles is obtained based on position determination with the communications system (as data is transmitted and received between the motor vehicles and the cellular network of the communications system), the time between each pair of time instants may be equal to or greater than the time between two consecutive position determinations by the communications system (e.g. 0.05 s, 0.1 s, 0.2 s, 0.5 s, etc.).

In some embodiments, both the number of motor vehicles of each grid for each time span and the number of predicted motor vehicles of the prediction grid are an aggregate or an average of the number of motor vehicles present and predicted in the corresponding portion of the zone, respectively, in the corresponding time span and the future time span.

In some embodiments, the motor vehicles counted in both the number of motor vehicles of each grid for each time span and the number of predicted motor vehicles of the prediction grid are motor vehicles connected to the communications system In some embodiments, orienting each reflector of the plurality of reflectors comprises operating an actuator of each reflector of the plurality of reflectors thereby orienting each reflector.

The actuators of the reflectors are communicatively coupled with a processor computing the orientations of the reflectors, either wirelessly (e.g. cellular communications, dedicated radio link, etc.) or by wired communications.

In some embodiments, the zone comprises a roundabout.

In some embodiments, the zone comprises a junction.

Roundabouts and junctions are particular locations in which large amounts of motor vehicles may be present at the same time due to the reduced speeds of the motor vehicles and driving maneuvers involved for safe driving.

Coverage of low-range wireless communications networks such as those that may be provided with a terahertz communications system tends to be reduced due to reduced line-of-sight between transmitters and receivers. The presence of multiple motor vehicles and other obstacles in roundabouts or junctions makes that for receiving electromagnetic waves with sufficient power, reflectors need be provided, and the reflectors need be oriented to provide communications with line-of-sight.

In some embodiments, each portion of the zone corresponding to a cell of the grids for the plurality of time spans and the prediction grid has an area equal to or less than 50 $m^2$, and preferably equal to 25 $m^2$.

In some embodiments, each portion of the zone corresponding to a cell of the grids for each time span and/or the prediction grid has a square surface.

A second aspect of the present disclosure relates to a communications system comprising:
- an antenna operable in one or more frequencies in a frequency range from 0.1 THz and 10.0 THz, the antenna being located in a zone;
- a plurality of reflectors, each reflector of the plurality of reflectors being located in the zone and being spaced apart from each other and the antenna; and
- at least one processor configured to perform the steps of a method according to the first aspect of the disclosure which are carried out digitally;
- each reflector of the plurality of reflectors being configured to be oriented according to the orientation digitally computed by the at least one processor.

The at least one processor may receive an obtained number of motor vehicles in the zone in the plurality of time spans so that the digital tasks may be carried out. To this end, the at least one processor may receive such data from the communications system, a global navigation satellite system. The at least one processor may also receive such data from another processor that digitally processes, for obtaining the presence of motor vehicles, measurements of one or more lidars or radars, or images taken by one or more cameras; alternatively the measurements or images may be sent to the at least one processor, which in turn digitally processes them for obtaining the presence of motor vehicles.

In some embodiments, the system further comprises a plurality of actuators, each actuator being configured to orient one reflector of the plurality of reflectors according to the orientation digitally computed by the at least one processor.

Similar advantages as those described for the first aspect of the disclosure are also applicable to the second aspect of the disclosure.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as an example of how the disclosure can be carried out. The drawings comprise the following figures.

DETAILED DESCRIPTION OF THE DRAWINGS

Figure 1:
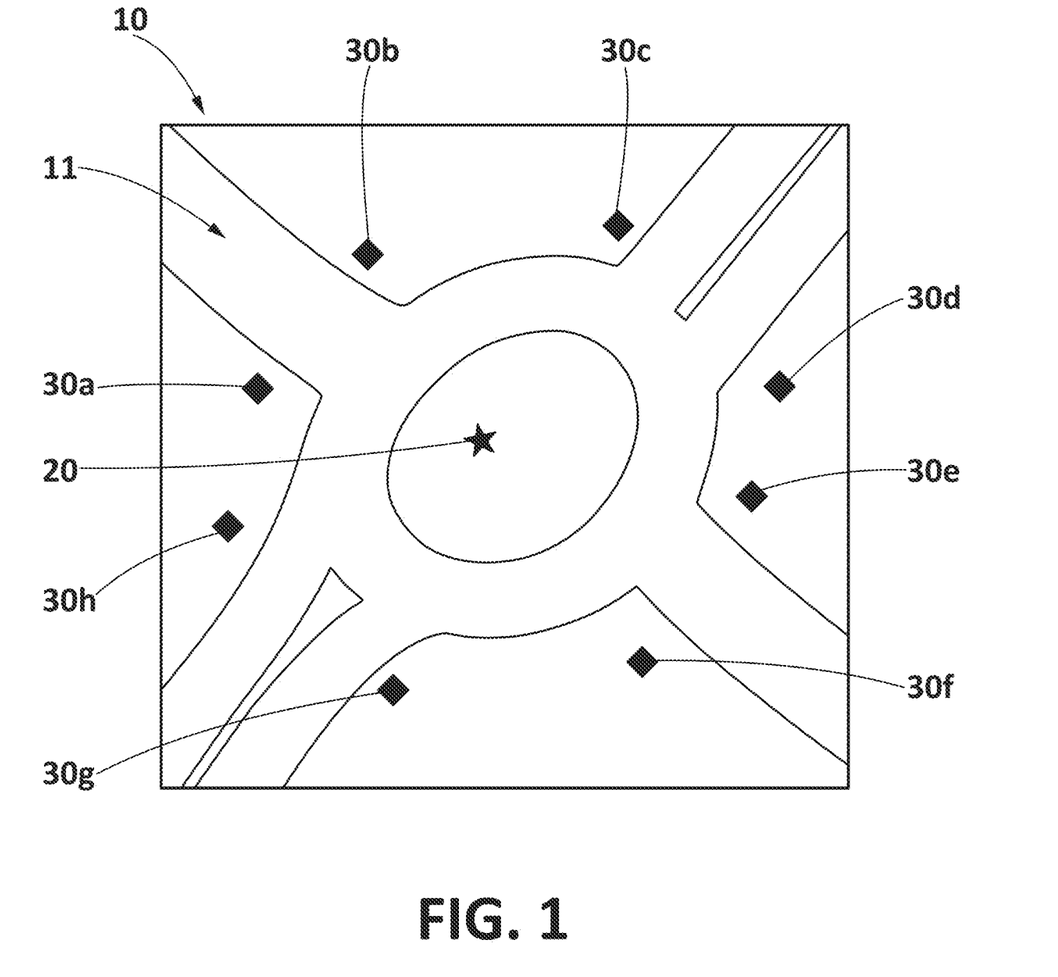
FIG. 1 shows a representation of a zone with a communications system.

FIG. 1 shows a representation of a zone 10 in which a communications system for data wireless communications with motor vehicles is installed. In this particular example, the zone 10 is a roundabout.

The communications system comprises an antenna 20 (represented with a star for illustrative purposes only) operable in one or more frequencies in a frequency range from 0.1 THz to 10.0 THz, and a plurality of reflectors 30a-30h (represented with rhomboids for illustrative purposes only) provided in portions of the zone 10 free of road 11 on which motor vehicles are driven. The reflectors 30a-30h are fixed in the locations where they are installed, and can be oriented by means of actuators. In this particular example, each reflector of the plurality of reflectors 30a-30h is provided proximate to an intersection of the road 11 with the roundabout, though it is readily apparent that the reflectors could be installed differently. The antenna 20 is an omnidirectional antenna at least in a horizontal plane (i.e. the plane defined by the floor and the road 11), that is, the antenna 20 comprises a radiation pattern that is substantially omnidirectional at least in said horizontal plane.

Some or all motor vehicles (that are to be driven on the road 11) are to establish a wireless communications radio link with the antenna 20 both for transmission and reception of data. As more motor vehicles are present within the zone 10, it is less likely that a particular motor vehicle may have direct line-of-sight with the antenna 20 due to the presence of other motor vehicles blocking the line-of-sight. Accordingly, the reflectors 30a-30h are to reflect electromagnetic waves radiated by the antenna 20 or the motor vehicles either towards the motor vehicles (i.e. the motor vehicles are capturing electromagnetic waves from the antenna 20 thereby receiving data) or the antenna 20 (i.e. the motor vehicles are radiating electromagnetic waves to the antenna 20 thereby transmitting data).

Figure 2:
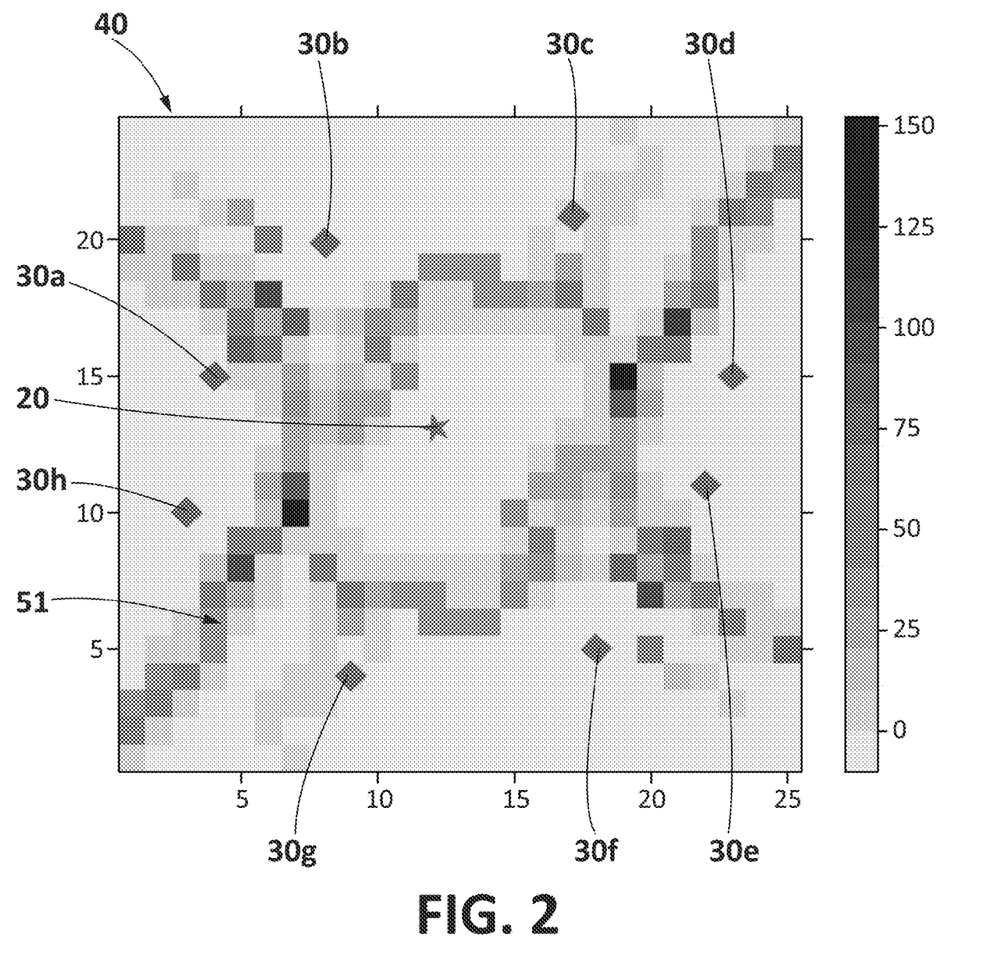
FIG. 2 shows a representation of a grid of the zone of FIG. 1 for a time span.

FIG. 2 shows a representation of a grid 40 of the zone 10 of FIG. 1 for a time span. The communications system shown in FIG. 1 is also represented in FIG. 2 for better understanding of what is represented in the grid 40.

The grid 40 comprises $N_x$ columns (in this example $N_x$=25), and $N_y$ rows (in this example $N_y$=24), thus comprising NI, times $N_y$ cells (in this example 600 cells). Each cell of the grid 40 represents a portion of the zone 10, for example a portion with a width of 5 meters and a length of 5 meters totaling an area of 25 $m^2$. Each cell of the grid 40 is color-coded (according to a color legend illustrated next to the grid 40) for representing a number of motor vehicles 51 that have been in the corresponding portion of the zone 10 during the time span. As it can be seen by comparing FIGS. 1 and 2, the cells corresponding to portions of the zone 10 free of the road 11 have zero motor vehicles, whereas intersections between the roundabout and the entrances thereto have the largest numbers of motor vehicles due to the reduced speed of the motor vehicles when entering into the roundabout.

Grids as the grid 40 may be provided by obtaining the number of motor vehicles 51 in the zone 10 for each time span. The number of motor vehicles 51 may be obtained, for instance, by determination of the communications system as transmission and reception of data takes place between the motor vehicles and the cellular network of the communications system (the cellular network determines the position of the motor vehicles and provides that data to the communications system), by determination of a global navigation satellite system (the positioning of the motor vehicles determined with such system being transmittable to at least one processor carrying out the different processing steps), or by determination through digital processing of measurements of lidars or radars, or images taken by one or more cameras.

In the example of FIG. 2, the time span has a time duration of 30 seconds, and the time span has a plurality of time instants; the time elapsed between each pair of time instants is 0.1 seconds, thus the time span comprises a plurality of 300 consecutive time instants. At each time instant the number of motor vehicles in the zone 10 has been obtained and the aggregate of the number of motor vehicles in the zone 10 of each time instant is represented in the grid 40 for the time span.

Figure 3:
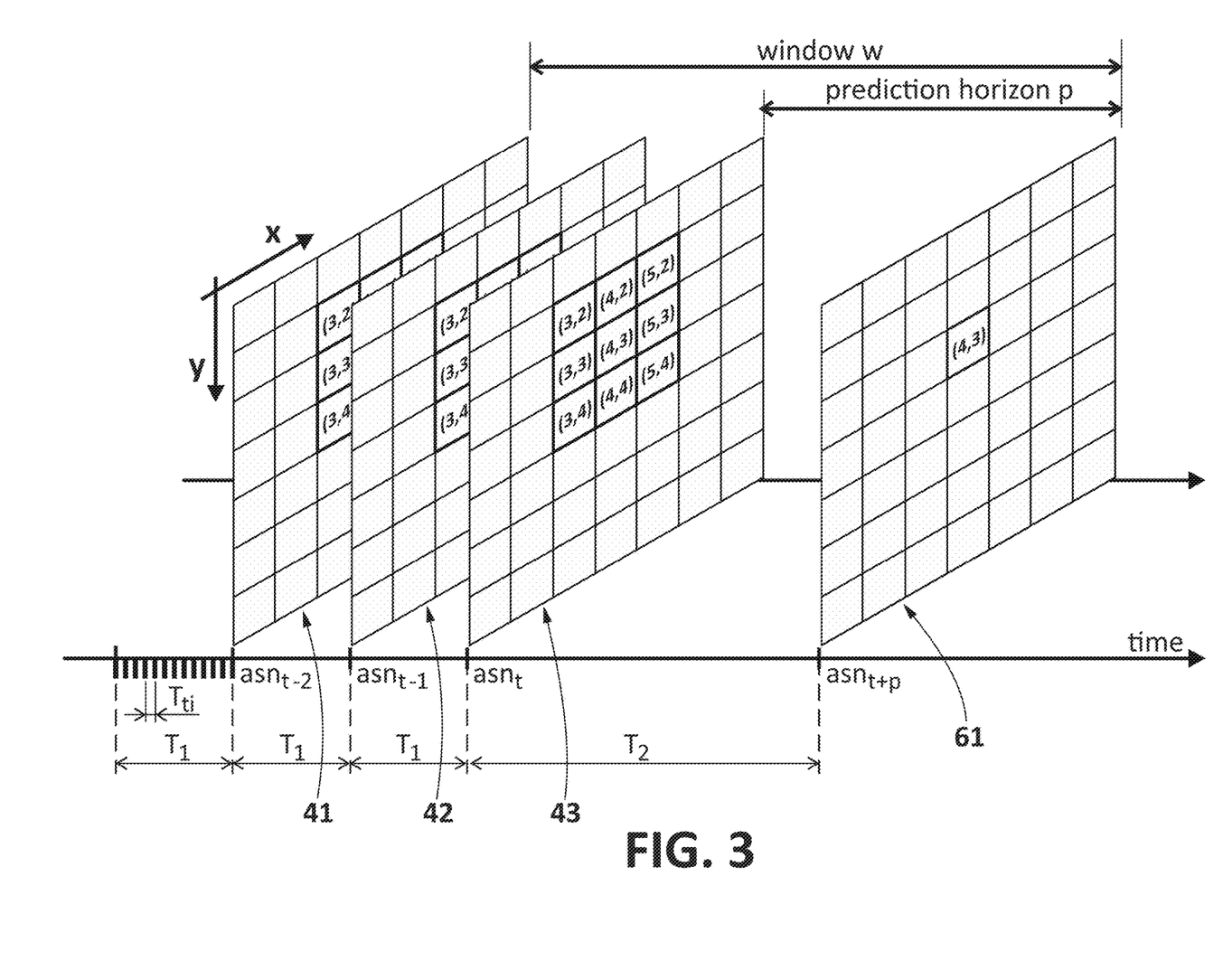
FIG. 3 shows a representation of grids for time spans and a prediction grid for a future time span.

FIG. 3 diagrammatically shows a representation of grids 41-43 for time spans (of time duration $T_1$) and a prediction grid 61 (which may be of time duration $T_1$, or of a time duration greater than $T_1$ in which case it is preferably $N \cdot T_1$ and where N is a natural number not greater than 10) for a future time span. Each of the grids 41-43 may be provided as described with reference to the grid 40 of FIG. 2.

The diagram of FIG. 3 shows a time axis extending in a horizontal direction. After a time span ends (i.e. after the time duration $T_1$), a corresponding grid 41-43 is provided (for a better understanding of the diagram, first, second and third time spans are identified as 2, 1, 0 and, accordingly, the grids $asn_{t-2}$, $asn_{t-1}$, and $asn_t$ are provided). Each time span comprises a plurality of time instants. For illustrative purposes, in FIG. 3 there is shown a plurality of lines for the first time span (of grid $asn_{t-2}$) corresponding to the time instants thereof (the second and the third time spans also comprise pluralities of time instants with the same number of time instants than the first time span); each time instant occurs after a time $T_{ti}$ has elapsed from a previous time instant. Beyond the third grid 43 the prediction grid 61 is provided (for which the future time span is identified as p, thus the prediction grid provided is $asn_{t+p}$) in a prediction horizon p. Overall, a window with size w is considered which extends from the first grid 41 up to the prediction grid 61. The prediction grid 61 comprises the number of expected motor vehicles in each portion of a zone after a time $T_2$ has elapsed after the grid 43 (i.e. $asn_t$) has been provided.

Further, for illustrative purposes, in the first, the second, and the third grids 41-43 is represented a cell corresponding to position (4,3) for which cells having neighbors with a neighbor order parameter Π equal to 1 are highlighted. The cells with such neighbors are those that are adjacent to the cell (4,3) for which the neighbor order parameter Π equal to 1 has been computed, as they fulfill the following criteria:

$|x'-x| \leq \Pi$ $|y'-y| \leq \Pi$ where x' and y' are coordinates of the cell for which it is being assessed whether it is a Π-order neighbor of cell with coordinates x and y (in this example, x=4 and y=3). As Π=1, only the cells surrounding the cell (4,3) are neighbors thereof. In other examples, Π-order neighbor cells are found with Π=2.

Figure 4:
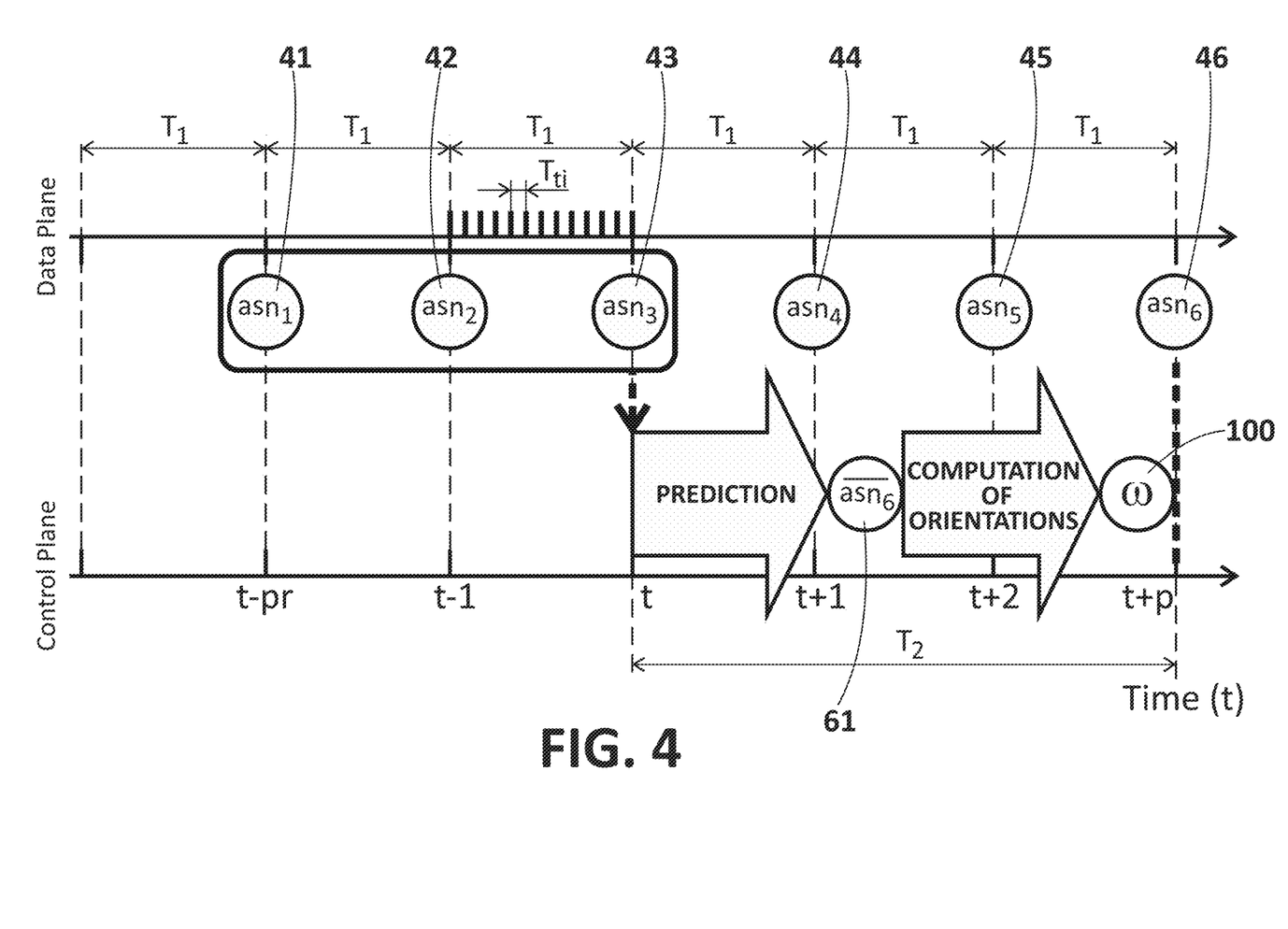
FIGS. 4-5 show processes for providing a prediction grid.

FIG. 4 diagrammatically shows a process for providing the prediction grid 61 while the first, the second and the third grids 41-43 are provided.

When the first, the second and the third grids 41-43 (respectively referred to, in FIG. 4, as $asn_1$, $asn_2$, and $asn_3$ which correspond to three time spans) are provided (for illustrative purposes, in FIG. 4, the plurality of time instants has been represented for the third time span), the prediction grid 61 for the future time span is provided with a short-term traffic estimation. In this example, the time $T_2$ is equal to three times the time duration $T_1$ (accordingly, in FIG. 4, the prediction grid 61 is referred to as $\overline{asn_6}$). With the prediction grid 61, orientations of the plurality of reflectors (for example the reflectors 30a-30h of FIGS. 1 and 2) are optimized according to an objective function with which the estimated power reception is globally maximized for cells in which the number of motor vehicles is, preferably, not zero. Since the optimization of the objective function involves changing orientations of the reflectors, the configuration for which the objective function is best optimized results in a set of orientations 100 including orientation w for each reflector. In this example, the optimization is made with a genetic algorithm. In other examples, the optimization is made with another optimization technique such as a deep neural network.

Meanwhile the prediction grid 61 and the set of orientations 100 are being provided, further grids such as for instance fourth, fifth and sixth grids 44-46 (respectively referred to in FIG. 4 as $asn_4$, $asn_5$, and $asn_6$ which correspond to three time spans, that may be consecutive or not) are provided so that successive prediction grids and sets of orientations may be digitally computed for successive future time spans. An example of how further prediction grids and sets of orientations may be provided is illustrated in FIG. 5.

Figure 5:
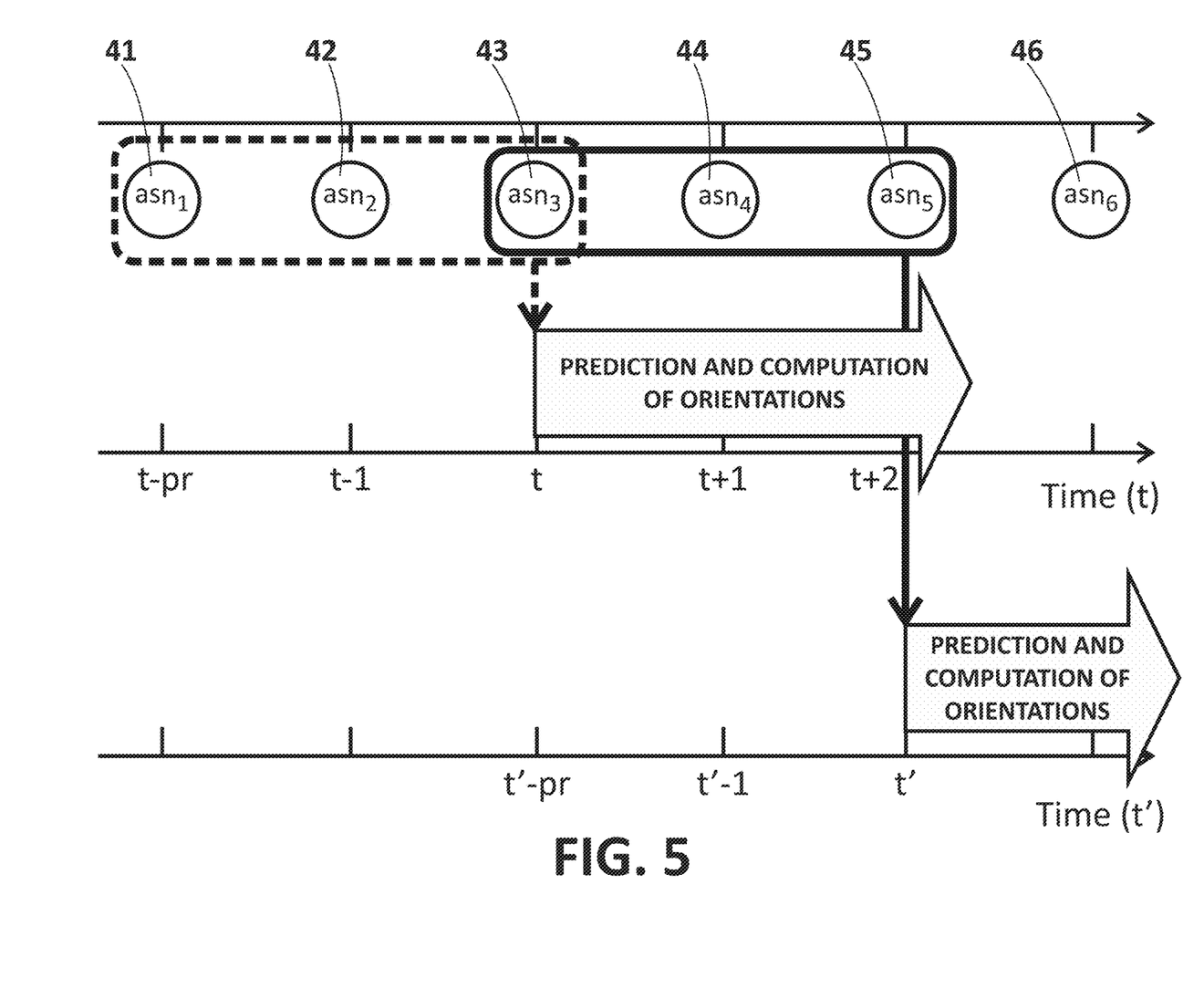

FIG. 5 diagrammatically shows a process for providing a plurality of prediction grids with grids 41-46 for different time spans.

The workflow of the process may entail using a sliding window with which successive predictions of motor vehicles and reorientations of reflectors may be carried out. The sliding window has a duration that extends from the beginning of a first time span of a plurality of time spans up to the beginning of the future time span. The reflector reorientation process (traffic prediction, digital computation of orientations and reflector reconfiguration) takes place while the sliding window lasts. The reflector reorientation process starts once the last time span of the plurality of time spans is provided, and shall end or have ended when the time span corresponding to the future time span starts.

In this example, a sliding window has an interval s corresponding to two time spans (i.e. s=2) and the sliding window extends from t-pr to t+2 (five time spans). First, the sliding window comprises the first, the second and the third grids 41-43 with which a first prediction grid, and thus a first set of orientations for reflectors, are to be provided by the t+2 time (so that the reflectors may be reoriented when the time span corresponding to the future time span starts). Then, the sliding window slides the interval s, thereby comprising the third, the fourth and the fifth grids 43-45 with which a second prediction grid and, thus, a second set of orientations for reflectors are to be provided. The sliding window successively slides so that additional sets of orientations may be computed as additional prediction grids are provided.

In other examples, the interval s of the sliding window is one time span (i.e. s=1), three time spans (i.e. s=3), or more.

When the interval s is greater than 1 and the duration of a first future time span is $N \cdot T_1$ with N<s, the set of reflector orientations provided based on a first prediction grid may be maintained in the reflectors for a period longer than the duration of this first future time span. In this way, upon providing a further set of reflector orientations based on a second prediction grid, the orientations of the further set may be applied to the reflectors when a second future time span takes place.

The interval s of the sliding window can be adjusted based on the desired accuracy in the predictions as the prediction grids may be provided more often for computing orientations of reflectors of a communications system. It is readily apparent that predicting future motor vehicle density distributions and computing the orientations of the reflectors for two or more different windows may overlap in time (part of a duration between the provision of the grid of the last time span of windows and the start of the corresponding future time spans). Accordingly, these steps of one window may be run in parallel with the same steps of another window (as shown for instance with the t and t' time axes); to this end, the same processors or different processors may perform the corresponding computations. In any case, the steps of each window should be carried out from the provision of the grid of the last time span of the corresponding window and the start of the future time span of the corresponding window (as shown in FIG. 4 with the $T_2$ time duration).

Figure 6:
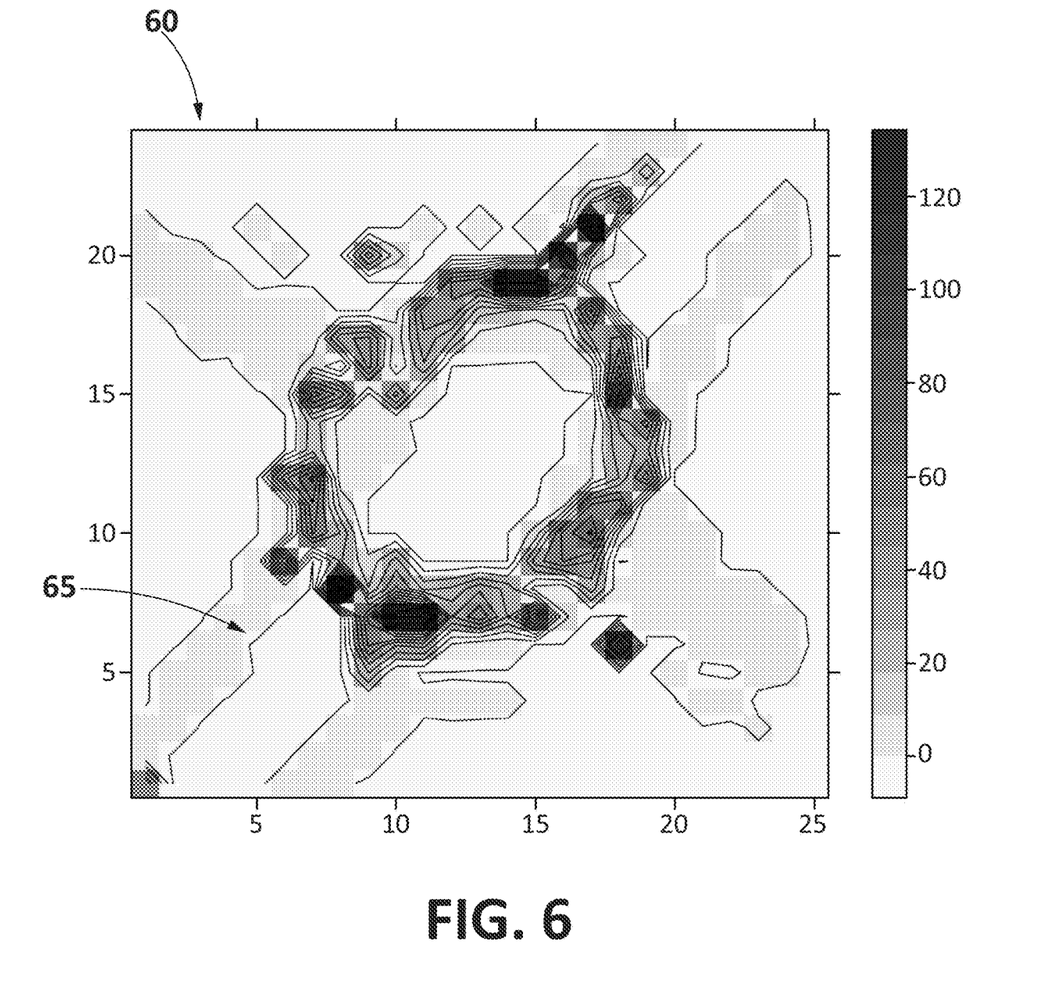
FIG. 6 shows a representation of a prediction grid of the zone of FIG. 1 for a future time span.

FIG. 6 shows a representation of a prediction grid 60 of the zone 10 of FIG. 1 for a future time span.

The prediction grid 60 comprises $N_x$ columns (in this example $N_x$=25), and $N_y$ rows (in this example $N_y$=24), thus comprising $N_x$ times $N_y$ cells (in this example 600 cells). Each cell of the grid 60 is color-coded (according to a color legend illustrated next to the grid 60) for representing a number of motor vehicles 65 that are predicted to be in the corresponding portion of the zone 10 during the future time span. Also, gradient contours (i.e. contours grouping cells having same or similar value in terms of predicted motor vehicles) have been illustrated for better representing the predicted motor vehicle densities.

The objective function to be optimized attempts to orientate the reflectors of a terahertz communications system such that the power with which it is estimated that the electromagnetic waves are to be received in each of the cells with expected presence of motor vehicles is globally maximized.

Figure 7:
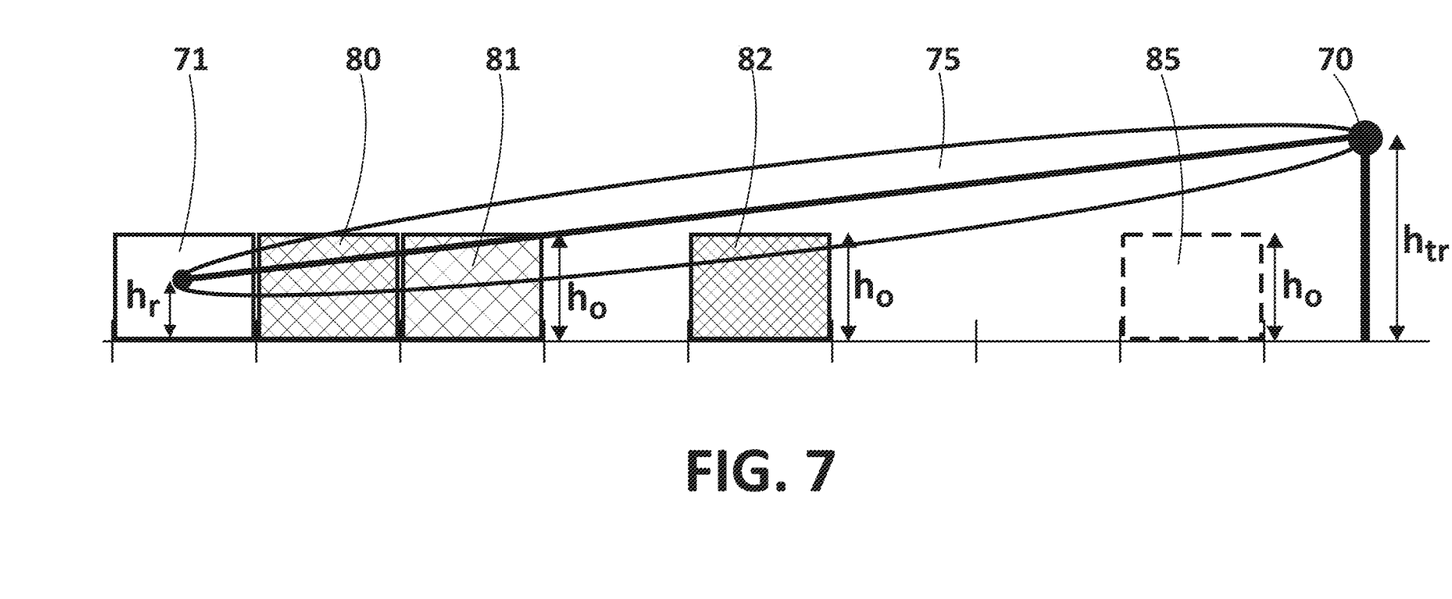
FIG. 7 shows possible obstacles between a transmitter and a receiver for wireless communications in terahertz frequencies.

FIG. 7 diagrammatically shows, in a side view, possible obstacles 80-82, 85 between a transmitter 70 and a receiver 71 for wireless communications in terahertz frequencies.

A number of possible obstacles 80-82, 85 may be between the transmitter 70 (e.g. an antenna of a communications system operating in a terahertz frequency ranging from 0.1 THz to 10.0 THz) and the receiver 71 (e.g. a motor vehicle) such that they block direct line-of-sight 75. The transmitter 70 has an antenna at a height $h_{tr}$ with respect to a ground level whereas the receiver 71 has an antenna at a height $h_r$ with respect to the ground level. Each of the possible obstacles 80-82, 85 may be, for instance, a motor vehicle with a height ho with respect to the ground level.

The direct line-of-sight 75 of the wireless communications is blocked by first, second and third obstacles 80-82 as the height thereof is at least in the path between the transmitter 70 and the receiver 71. The presence of the first, the second and the third obstacles 80-82 may be taken into account when estimating the power received in each cell of a prediction grid since motor vehicles are predicted for cells in the path between a cell comprising the transmitter 70 and a cell comprising the receiver 71. Thus knowing whether motor vehicles are expected in said path, the computation of the orientations of the reflectors may yield better overall coverage as possible line-of-sight 75 blockings are taken into account while optimizing the objective function.

Even though in this example the transmitter 70 has been identified as an antenna of the terahertz communications system, and the receiver 71 has been identified as a motor vehicle, it is readily apparent that the motor vehicle may be the transmitter and the antenna of the terahertz communications system may be the receiver as well.

Figure 8:
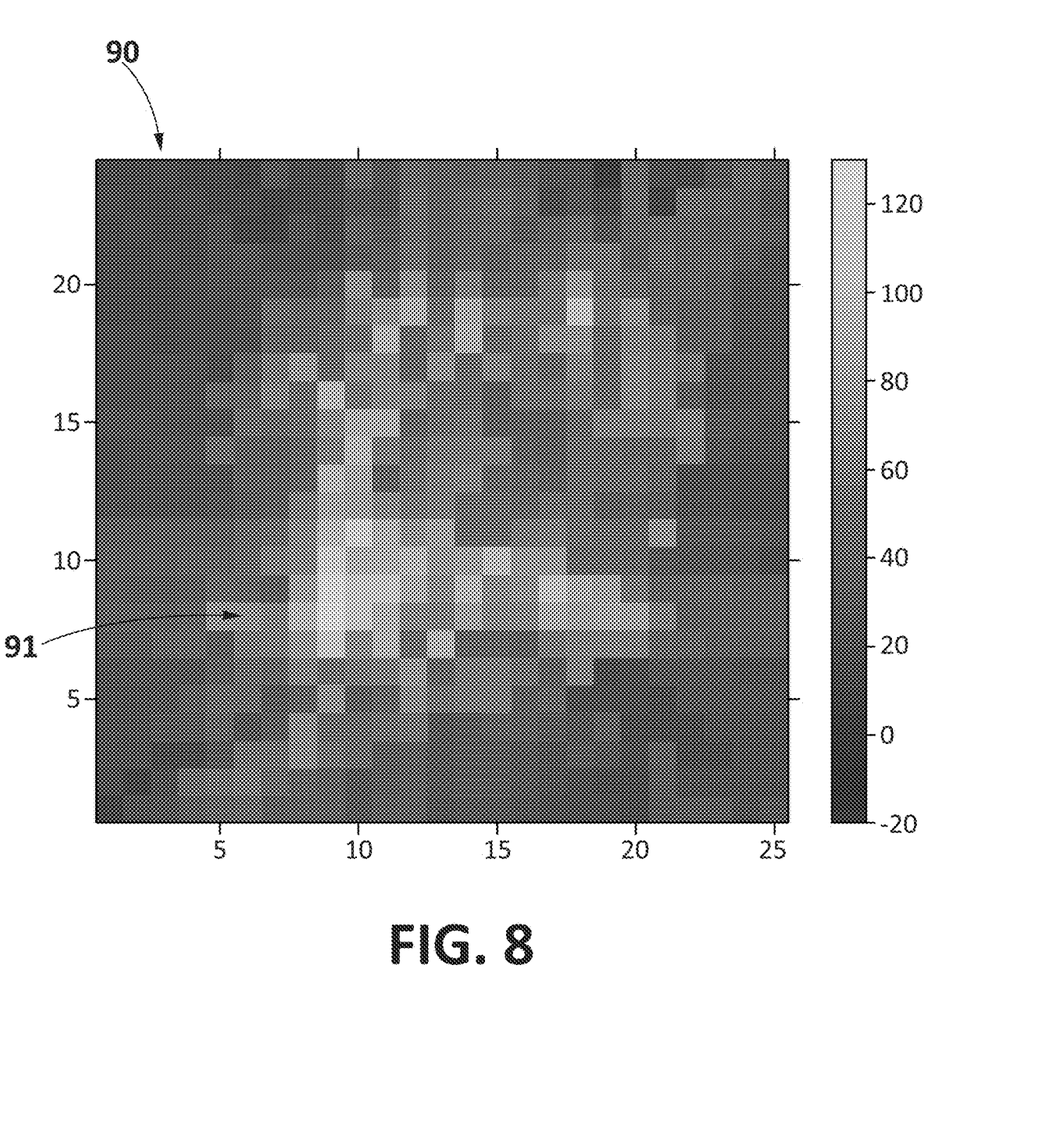
FIG. 8 shows a representation of an estimated power reception on a grid according to a prediction grid of the zone of FIG. 1 when orientations of reflectors of a communications system are digitally computed.

FIG. 8 shows a representation of an estimated power reception on a grid 90 according to a prediction grid of the zone 10 of FIG. 1 when orientations of reflectors of a communications system are digitally computed.

The grid 90 comprises $N_x$ columns (in this example $N_x$=25), and $N_y$ rows (in this example $N_y$=24), thus comprising NI, times $N_y$ cells (in this example 600 cells). Each cell of the grid 90 is color-coded (according to a color legend illustrated next to the grid 90) for representing estimated total power reception 95 (in dBm) according to a prediction grid, an antenna of a terahertz communications system and a plurality of reflectors with an optimized set of orientations.

As it may be observed, the estimated power reception 95 with the optimized set of orientations is greater in the intersections of the roundabout with entrances thereof than in the entrances themselves or even in some parts of the roundabout. This is so because in this example it is predicted that more motor vehicles are to be in these portions of the zone 10 (i.e. the intersections of the roundabout). However, for other portions of the zone 10 comprising the road 11 the estimated power reception 95 is also considerable so that the overall coverage for wireless communications with the motor vehicles is sufficient for data transmission and reception in most portions in the zone 10.

Even though in the present disclosure some embodiments have been described in relation to particular equations (for estimating the power reception of electromagnetic waves radiated by the antenna at each cell of the prediction grid and with the predetermined orientation of each reflector of the plurality of reflectors), it will be readily apparent to the skilled person that embodiments in which other equations are digitally computed also fall within the scope of the present disclosure. Similarly, objective functions other than that described in the present disclosure may also be optimized in embodiments that also fall within the scope of the present disclosure.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A method for orienting a plurality of reflectors of a communications system in a zones, the communications system comprising an antenna and the plurality of reflectors, the antenna being operable in one or more frequencies in a frequency range from 0.1 THz to 10.0 THz, each reflector of the plurality of reflectors being spaced apart from each other and the antenna, the method including the steps of:
- digitally predicting a future motor vehicle density distribution in the zone based on a plurality of obtained past motor vehicle density distributions in the zone;
- digitally computing an orientation of each reflector of the plurality of reflectors such that estimated power reception of electromagnetic waves radiated by the antenna is globally maximized for each motor vehicle of the future motor vehicle density distribution; and
- orienting each reflector of the plurality of reflectors according to the digitally computed orientation.

2. The method of claim 1, wherein digitally predicting the future motor vehicle density distribution in the zone based on the plurality of obtained past motor vehicle density distributions in the zone includes the steps of:
- obtaining a number of motor vehicles in the zone in a plurality of time spans;
- digitally providing a grid for each time span of the plurality of time spans, each grid comprising a plurality of cells each representing a number of motor vehicles in a corresponding portion of the zone in a corresponding time span of the plurality of time spans; and
- digitally providing a prediction grid for a future time span based at least on the grids of the plurality of time spans, the prediction grid comprising a plurality of cells each representing a number of predicted motor vehicles in a corresponding portion of the zone in the future time span.

3. The method of claim 2, wherein digitally computing the orientation of each reflector of the plurality of reflectors such that estimated power reception of electromagnetic waves radiated by the antenna is globally maximized for each motor vehicle of the future motor vehicle density distribution includes the steps of:
- digitally estimating a power reception of electromagnetic waves radiated by the antenna at each cell of the prediction grid and with a predetermined orientation of each reflector of the plurality of reflectors; and
- digitally computing an orientation of each reflector of the plurality of reflectors based on the estimation of the power reception such that an estimated power reception is globally maximized for each predicted motor vehicle of the prediction grid.

4. The method of claim 3, wherein:
- each time span of the plurality of time spans has a first time duration, the first time duration preferably being equal to or greater than 30 seconds and less than or equal to 60 seconds; and
- the future time span starts after a second time duration upon ending of a last time span of the plurality of time spans, the second time duration being equal to or greater than two times the first time duration, and equal to or less than five times the first time duration.

5. The method of claim 3, wherein:
- obtaining the number of motor vehicles in the zone in the plurality of time spans comprises the step of obtaining the number of motor vehicles in the zone at least in as many pluralities of time instants as time spans of the plurality of time spans, wherein each time span of the plurality of time spans comprises a corresponding plurality of time instants of the pluralities of time instants; and
- each cell of the grid for each time span represents the number of motor vehicles in the portion of the zone corresponding to the cell as an aggregate of each time instant of the plurality of time instants of the corresponding time span.

6. The method of claim 5, wherein:
- the plurality of time spans at least comprises a first time span, a second time span, and a third time spans;
- the pluralities of time instants at least comprise a first time instant, a second time instant, and a third time instants; and
- the first time span, the second time span, and the third time spans respectively comprise the first time instant, the second time instant, and the third time instants.

7. A communications system comprising:
- an antenna operable in one or more frequencies in a frequency range from 0.1 THz to 10.0 THz, the antenna being located in a zone;
- a plurality of reflectors, each reflector of the plurality of reflectors being located in the zone and being spaced apart from each other and the antenna; and
- at least one processor configured to perform the following steps of the method of claim 3:
- digitally providing a grid for each time span of the plurality of time spans, each grid comprising a plurality of cells each representing a number of motor vehicles in a corresponding portion of the zone in a corresponding time span of the plurality of time spans;
- digitally providing a prediction grid for a future time span based at least on the grids of the plurality of time spans, the prediction grid comprising a plurality of cells each representing a number of predicted motor vehicles in a corresponding portion of the zone in the future time span;
- digitally estimating a power reception of electromagnetic waves radiated by the antenna at each cell of the prediction grid and with a predetermined orientation of each reflector of the plurality of reflectors; and
- digitally computing an orientation of each reflector of the plurality of reflectors based on the estimation of the power reception such that an estimated power reception is globally maximized for each motor vehicle according to the prediction grid;
- each reflector of the plurality of reflectors being configured to be oriented according to the orientation digitally computed by the at least one processor.

8. The method of claim 2, wherein digitally providing a prediction grid for a future time span includes the steps of:
- digitally computing neighbors with a neighbor order parameter II for each cell of the grids for the plurality of time spans, the neighbor order parameter II being 1 or 2;

digitally discarding each cell of the grids for the plurality of time spans for which the number of motor vehicles is lower than a predefined threshold; and digitally running a regression algorithm on the grids for the plurality of time spans resulting from the steps of digitally computing the neighbors and digitally discarding cells, thereby providing the prediction grid, the regression algorithm preferably being a random forest regression algorithm.

9. The method of claim 2, wherein digitally computing an orientation of each reflector of the plurality of reflectors includes the step of:

digitally running a genetic algorithm with the prediction grid and the digitally estimated power reception, the genetic algorithm digitally computing the orientation of each reflector of the plurality of reflectors.

10. The method of claim 9, wherein the genetic algorithm comprises:

a plurality of individuals, each individual encoding a configuration of the plurality of reflectors, each individual comprising a plurality of genes, each gene encoding an orientation angle of a reflector of the plurality of reflectors;

recombination of two individuals whereby a first half of the orientation angles are taken from a first individual of the two individuals and a second half of the orientation angles are taken from a second individual of the two individuals; and mutation whereby values of a fourth of the orientation angles are increased or decreased.

11. The method of claim 10, wherein the genetic algorithm further comprises initialization with a first population whereby each gene of each individual of the plurality of individuals has a value:

randomly assigned; or assigned according to a digitally computed orientation angle of a corresponding reflector, the digitally computed orientation angle being a previous digital computation of an orientation of each reflector of the plurality of reflectors based on a previous estimation of the power reception such that an estimated power reception is globally maximized for each predicted motor vehicle of a different prediction grid.

12. The method of claim 2, wherein obtaining the number of motor vehicles in the zone in the plurality of time spans includes the step of:

receiving position information of the motor vehicles in the plurality of time spans, the position information being provided by the communications system or a global navigation satellite system; or detecting the presence of motor vehicles in the zone in the plurality of time spans with one or more presence sensors, the one or more presence sensors at least comprising one of: one or more cameras, one or more lidars, and one or more radars.

13. The method of claim 2, wherein:

both the number of motor vehicles of each grid for each time span and the number of predicted motor vehicles of the prediction grid are an aggregate or an average of the number of motor vehicles present and predicted in the corresponding portion of the zone, respectively, in the corresponding time span and the future time span; and the motor vehicles counted in both the number of motor vehicles of each grid for each time span and the number of predicted motor vehicles of the prediction grid are motor vehicles connected to the communications system.

14. The method of claim 1, wherein orienting each reflector of the plurality of reflectors comprises includes operating an actuator of each reflector of the plurality of reflectors thereby orienting each reflector.

15. The method of claim 1, wherein:

the zone comprises a roundabout or a junction; and each portion of the zone corresponding to a cell of the grids for the plurality of time spans and the prediction grid has an area equal to or less than 50 $m^2$, and preferably equal to 25 $m^2$.

* * * * *